Oct. 31, 1961  J. CLAYTON, JR  3,007,127
POTENTIOMETER
Filed Oct. 17, 1958
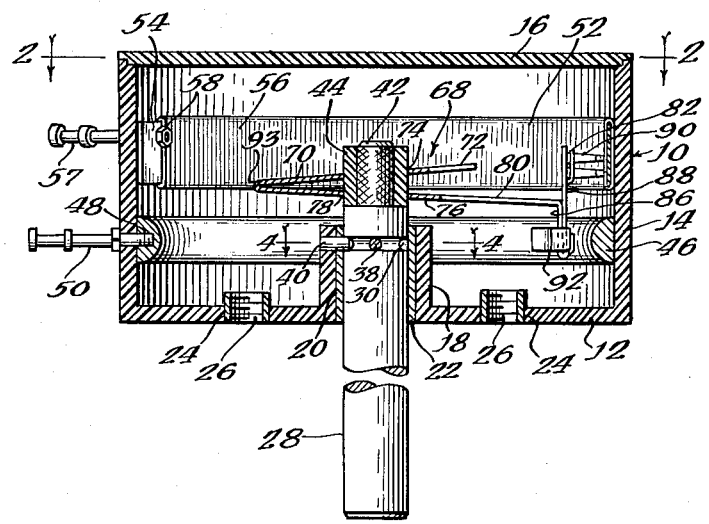
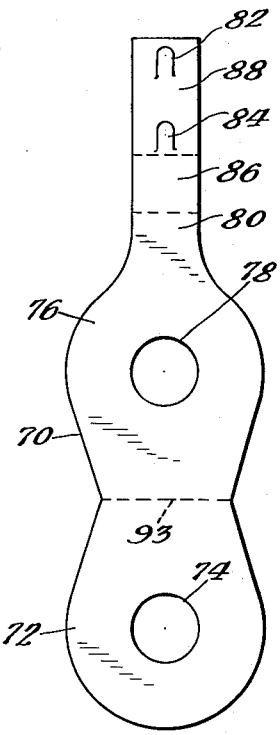
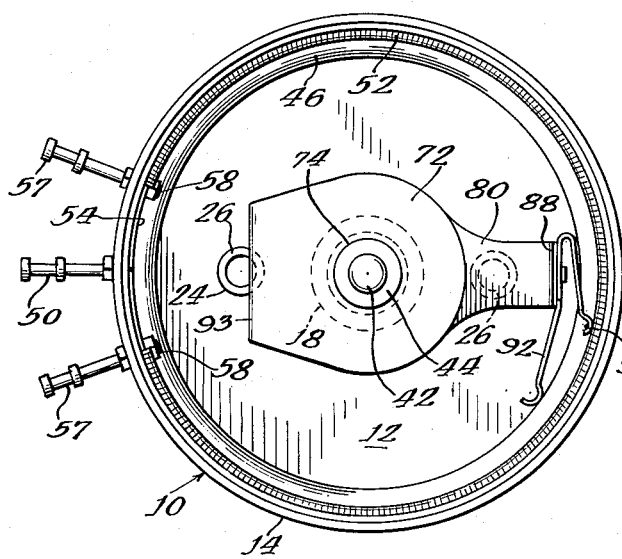
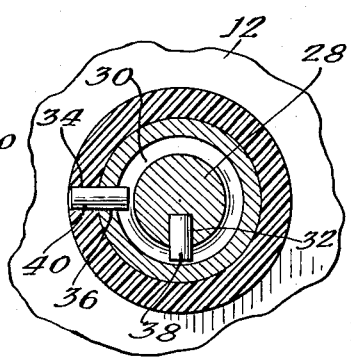
Inventor:
John Clayton, Jr.
By: Graf, Nierman & Burmeister
Attorneys

United States Patent Office 3,007,127
Patented Oct. 31, 1961

3,007,127
POTENTIOMETER
John Clayton, Jr., Maynard, Mass., assignor to Waters Manufacturing, Inc., Wayland, Mass., a corporation of Massachusetts
Filed Oct. 17, 1958, Ser. No. 767,825
14 Claims. (Cl. 338—174)

This invention relates to an improved construction for a potentiometer, and more particularly to a construction for a precision potentiometer for industrial use which is of substantially lower cost than those heretofore available.

Precision potentiometers are used extensively in many electronic devices, particularly for military and aircraft applications, but the cost of precision potentiometers has heretofore been too high to permit their use in the design of many industrial electronic devices, in which cost is a highly critical factor. The present invention relates to an improved construction which reduces the number and complexity of parts of a precision potentiometer, and increases the ease of assembly, so that the cost of the potentiometer is materially decreased, without substantial loss of precision and accuracy. Among the more costly portions of potentiometer constructions heretofore employed where precision is required are the wiper or movable tap assembly, and the slip ring structure by means of which the movable tap is connected to a fixed terminal for connection to an external circuit. The present invention provides a novel construction for these portions of a potentiometer which greatly reduces their cost, while still giving the precision of operation required for industrial applications of precision potentiometers. In addition it affords a novel and simple manner of mounting the shaft for stop-limited rotation with negligible end play.

For understanding of the manner in which the above advantages are obtained and for observation of further advantages of the invention of the same general nature, reference is made to the embodiment shown in the drawing in which:

FIGURE 1 is a cross-sectional view of a potentiometer embodying the present invention;

FIGURE 2 is a view of the potentiometer shown in FIGURE 1 taken on line 2—2 of that figure;

FIGURE 3 is a plan view of a flat brush arm blank used in the instant invention before the brush arm is folded to its final shape; and FIGURE 4 is a cross-sectional view taken on line 4—4 of FIGURE 1.

Referring now to the drawings, it may be seen that the illustrated potentiometer embodying the present invention includes a cup-shaped hollow base or housing 10. The base 10 has an end wall 12 and a cylindrical wall 14 which is formed integral with the end wall 12. The base 10 is molded of a suitable insulating material such as a phenolic resin. A cover 16, which is also molded of the same material, registers with the open end of cylindrical wall 14 to close the base or cover 10.

The end wall 12 has an internal boss 18 in the center thereof, with a shaft aperture 20 extending therethrough. A pair of mounting apertures 24 are formed in the end wall 12 and an internally threaded bushing 26 is mounted in each of said apertures. A sleeve bearing 22 is positioned in the shaft aperture 20, and a control shaft 28 is rotatably mounted in the sleeve bearing 22.

The shaft 28 has a circumferential groove 30 formed near the inner end. A pin hole 32 is drilled radially into the shaft 28 and opens onto the groove 30. The boss 18 has a stop pin hole 34 formed therein and the sleeve bearing 22 also contains a stop pin hole 36 which registers with the pin hole 34. A shaft pin 38 is press fitted in the pin hole 32, and, as may be seen in FIGURE 4, the length of pin 32 is such that the outer end is inward of the outer circumference of the shaft 28. A stop pin 40 is press fitted through the pin holes 34 and 36 and extends into the groove 30, its transverse dimension closely fitting the width of the groove, so that the shaft may freely rotate within the sleeve bearing, but has negligible end play. The rotation of the shaft 28 is limited by the engagement of pin 38 with stop pin 40 at both ends of its path.

The control shaft 28 is reduced at the inner end to form a knurled mounting stud 42. An insulating sleeve 44, which in this instance is made of a laminated phenolic resin, is press fitted onto the knurled stud 42.

A continuous conductive slip ring 46 of semi-circular cross-section is positioned in the base 10 proximate to the end wall 12. The slip ring has a threaded opening 48 which receives a threaded fastener terminal 50. The fastener terminal, which is aligned with the stop pin 40, extends through a snugly fitting aperture in the cylindrical wall 14 of the cover, so that the fastener terminal 50 simultaneously holds the slip ring 46 in position and provides an external electrical connection for the slip ring.

The outside diameter of the slip ring is only sufficiently less than the inside diameter of the cylindrical wall 14 to permit free sliding motion in its installation. Since the transversely flat outer surface of the continuous slip ring is thus in firm contact with the transversely flat inner surface of the cylindrical wall, the slip ring is securely held in position by the single fastener terminal which constitutes its electrical connection.

A resistance element 52 is positioned on the inside wall of the base 10 spaced from the slip ring. The resistance element 52 is a conventional wire wound resistance element which includes a resistance card 54 and a fine resistance wire 56 wound on slightly less than the entire length of the resistance card. The resistance element 52 is mounted on the base 10 by a pair of end fastener terminals 57 extending through the cylindrical wall 14 and through the respective ends of the resistance element 52 to make contact with the respective ends of the resistance wire and nuts 58 on the end of each of the fastener terminals holding the end fastener terminals in position, thus simultaneously holding the resistance element in place and providing electrical terminals protruding from the outer surface of the cylindrical wall 14. The end fastener terminals are positioned in the wall 14 equal angular distances from the fastener terminal 50.

A wiper assembly generally indicated by numeral 68 is mounted on the shaft 28 and electrically connects the resistance element with the slip ring. (The wiper assembly includes a brush arm 70 which is shown in its flat or blank condition in FIGURE 3. The brush arm 70, made from a flat sheet of flexible resilient conductor such as beryllium cooper, includes a first resilient mounting plate portion 72 having a hole 74, and a second resilient mounting plate portion 76 having a hole 78 in the center portion thereof, which hole 78 is identical to hole 74 and snugly slideable on the outside diameter of sleeve 44. An electrically conductive support arm portion 80 extends from the plate portion 76. The support arm 80 includes a folded portion 86 and a contact mount 88 having stamped therefrom tabs 82 and 84. A bifurcated resilient contact 90 is positioned between tab 82 and the contact mount 88 and soldered therein. The contact 90 engages resistance wire 56 of the resistance element 52. A second contact 92 is mounted between the tab 84 and the holder 88 and soldered therein. The second contact 92 engages the slip ring 46.

It may be seen that the wiper assembly is simply manufactured. The brush arm blank shown in FIGURE 3 is stamped out of a sheet of conductive material. The resilient mounting plate 72 is folded over along the line indicated at 93 to produce an angle of greater than 5 degrees but less than 90 degrees between the two resilient mounting plates, 30 degrees being a satisfactory angle. The holes 74 and 78 are symmetrically placed with respect to the fold line 93 so that they are in register when the plate 72 is folded flat on plate 76 by finger pressure in the later assembly operation.

The support arm 80 is formed by folding the folded portion 86 at 90 degrees to plate 76. Then the contact mount 88 is folded back 180 degrees over the folded portion 86, thereby placing the mount 88 perpendicular to the plate 76. The arm is then heat-treated to spring temper. The contact 92 is positioned between the tab 84 and the mount 88, and the bifurcated contact 90 is positioned between the tab 82 and the mount 88. The contacts are soldered into position to hold them securely on the support arm and to electrically connect them by means of the support arm.

The wiper assembly is installed in a simple manner. The resilient mounting plate 72 is pressed down against the resilient mounting plate 76 by finger pressure of the assembler so that the holes 74 and 78 are in registry. The plates are held in this position while being slipped over the insulating sleeve 44 to place the contacts 90 and 92 in electrical contact with the resistance element 52 and slip ring 46 respectively. The resilient mounting plates are then released and the resilience of the assembly spreads the plates apart. It will be seen that the matching apertures 74 and 78 form a straight unimpeded passage of a size decreasing with increase of the angle between the plates, this passage passing the shaft with a small clearance when the plates are pressed together. Thus, the plates are held in frictional engagement with the insulating sleeve 44, thereby frictionally mounting the wiper assembly on the control shaft. It may be seen that the contact 90 may be readily positioned for proper phasing by rotating the brush arm against the frictional force exerted by the spring. (It will be understood that for purposes of minimizing the number of views, the drawing shows the wiper assembly in an unadjusted position.)

It will be obvious to those skilled in the art, after careful perusal of the above description and examination of the annexed drawings, that many changes may be made without departing from the teachings of the invention, which may be incorporated in structures substantially differing in appearance from that herein illustrated and described. Accordingly the scope of the invention shall not be deemed to be limited by the particular embodiment shown in the drawing but shall be determined by the annexed claims.

What is claimed is:

1. A potentiometer having a housing including an end wall and a cylindrical wall integral therewith, a shaft rotatably mounted in said end wall and coaxial with said cylindrical wall, a slip ring snugly fitted into said cylindrical wall, a single fastener terminal extending through the cylindrical wall, said fastener terminal being threadedly attached to said slip ring to simultaneously hold said ring in position and provide an electrical terminal for the ring, a resistance element positioned adjacent to an interior surface of said cylindrical wall, a pair of end fastener terminals extending through the cylindrical wall and attached to said resistance element, each of said end fastener terminals being attached to one end of the resistance element and simultaneously holding said resistance element in position and providing electrical terminals for the respective end of the resistance element, a brush arm frictionally mounted on the shaft, said brush arm including a pair of resilient mounting plates integral with each other and a support arm integral with one of said mounting plates, each of said mounting plates having an opening therein, said shaft extending through said mounting plates and the resilience of said plates frictionally holding the plates on the shaft, a contact slideably contacting said resistance element, said contact being fixed to the support arm, and a second contact slideably contacting said slip ring and fixed to said support arm and electrically connected to the first mentioned contact.

2. A potentiometer having a cylindrical housing, a shaft rotatably supported in said housing, a slip ring mounted within said housing, a resistance element mounted on said housing, a pair of resilient plates formed integral with each other having an angle of less than 90 degrees therebetween, each of said plates having an opening therein, said plates frictionally mounted on said shaft by means of said openings, whereby the resilience of said plates tends to increase the angle therebetween to hold the plates on said shaft, a support arm integral with one of said plates, a contact electrically contacting the resistance element and fixed to said support arm, a second contact electrically contacting the slip ring and fixed to the support arm, and means electrically connecting the first mentioned contact and the second mentioned contact.

3. A wiper assembly for a potentiometer including a resilient plate having an aperture therein, a second resilient plate integral with the first resilient plate, said plates defining an angle of less than 90 degrees therebetween, said second resilient plate having an aperture therein registerable with the aperture in the first resilient plate and of identical size and configuration, the apertures forming a straight unimpeded passage of a configuration varying with the angle between the plates and a contact adapted to engage the resistance element of a potentiometer mounted on one of said plates.

4. A potentiometer having a housing, a resistance element mounted on said housing, a contact electrically contacting said resistance element, a support arm supporting said contact, a resilient plate having an opening therein integral with the support arm, a second resilient plate having an opening therein integral with the first mentioned plate and having an angle less than 90 degrees between said plates, a shaft rotatably mounted in said housing and extending through the opening in said plate, whereby the resilience of the plates frictionally holds the plates on the shaft, a second contact mounted on said support arm electrically connected to the first mentioned contact, a slip ring electrically contacting said second contact, and a fastener terminal attached to said slip ring, said fastener terminal protruding from said housing and simultaneously holding the slip ring in position and providing an electrical terminal for the slip ring.

5. A potentiometer having a hollow base, a resistance element mounted in said base, a pair of end fastener terminals extending through the base and attached to the resistance element, each of said end fastener terminals being attached to one end of the resistance element and simultaneously holding the resistance element in position and providing connectors for the respective ends of the resistance element, a contact engaging said resistance element, a slip ring mounted in the base, a fastener terminal extending through the base attached to the slip ring simultaneously holding the slip ring in position and providing an electrical terminal for said slip ring, a second contact electrically contacting said slip ring, a shaft rotatably mounted in said base, and a brush arm frictionally mounted on the shaft, said brush arm supporting and electrically connecting said contacts.

6. A potentiometer having a hollow open-ended base including an end wall and a cylindrical side wall integral with the end wall, a boss integral with the end wall, a shaft rotatably mounted in said boss, said shaft having a circumferential groove therein, a pin fixed in said shaft extending into said groove, a second pin mounted in said base extending into the groove to retain the shaft in the boss and cooperate with the first mentioned pin to limit the rotation of the shaft, an insulating sleeve mounted on the shaft within said base, a resistance element formed as a portion of a circle mounted on the interior of the base concentric with said side wall, a pair of end fastener terminals attached to respective ends of the resistance element, said end fastener terminals protruding from said side wall simultaneously providing connectors to the resistance element and holding said element in position, a continuous slip ring mounted on the interior side of the base side wall concentric with said side wall, a fastener terminal attached to said slip ring, said fastener terminal protruding from the exterior side of the side wall simultaneously providing a connector to the slip ring and holding the slip ring in position, and a wiper assembly frictionally mounted on the insulating sleeve, said wiper assembly including a pair of electrically connected contacts and a brush arm, one of said contacts electrically contacting the resistance element and the other of said contacts electrically contacting the slip ring, said brush arm including a support arm supporting said contacts, a resilient plate integral with the support arm, and a second resilient plate integral with the first mentioned resilient plate and having an angle of less than 90 degrees between said plates, each of said plates having an opening therein with the insulating sleeve positioned in said openings, whereby the resilience of said plates tends to increase the angle between said plates thereby frictionally holding the brush arm on the sleeve.

7. A potentiometer having a base, a resistance element mounted on said base, a movable contact, a shaft rotatably mounted in the base and positioning said contact, said shaft having a circumferential groove therein, a pin fixed in said shaft and extending into said groove, and a second pin mounted in said base and extending into said groove, whereby said second pin retains the shaft in the base and cooperates with the first mentioned pin to limit the rotation of the shaft.

8. A potentiometer comprising a circular resistance element and a shaft extending axially of the resistance element and carrying a wiper contact assembly, the wiper contact assembly comprising a unitary resilient member having apertured portions folded so that the apertures are in register, the apertures being of a size to snugly pass the shaft and the shaft being seated in the apertures with the portions confined against spreading only by the shaft, so that the resilience of the member holds the assembly in position on the shaft by gripping of the shaft by both portions thereof, and a wiper contact mounted on the resilient member and contacting the resistance element, the shaft being frictionally rotatable in the apertures.

9. A potentiometer having a shaft, a cylindrical housing rotatably supporting the shaft and having a cross-sectionally flat inner surface, a resistance element mounted within the housing, a contact electrically contacting the resistance element, means for supporting the contact on the shaft for rotation therewith, a slip ring having a cross-sectionally flat radially outer surface snugly fitted within the radially inner surface of the housing, a second contact connected to the first contact and mounted on the shaft in sliding electrical contact with the slip ring, and a fastener terminal secured to the slip ring and protruding radially through the housing to simultaneously hold the ring in position and provide an exterior electrical terminal for the sliding contact, the fastener terminal being snugly seated in an aperture in the housing to confine the terminal against motion and being the sole fastening means for the slip ring.

10. A wiper assembly for a potentiometer comprising a pair of members having apertures of substantially identical size and generally circular configuration, resilient means joining said members along a line such that the apertures are in register when the members are pressed together, and a contact adapted to engage the resistance element of a potentiometer mounted on one of said members, the apertures forming a straight unimpeded passage of a size decreasing with increase of the angle between the members, whereby the wiper may be installed on a shaft in desired longitudinal and rotational location by inserting the shaft through the apertures with the members pressed together, the resilient means clamping the wiper on the shaft when the members are released.

11. In a potentiometer having a resistance element and a shaft, a wiper assembly comprising a pair of members having apertures, and resilient means joining said members along a line such that the apertures are in register when the members are pressed together, and a contact engaging the resistance element and mounted on one of said members, the apertures forming a straight unimpeded passage of a size decreasing with increase of the angle between the members, the shaft extending through both apertures and the resilient means clamping the edges of both apertures on the shaft, the shaft being frictionally rotatable in the apertures.

12. A potentiometer having a base, a resistance element mounted on said base, a movable contact, a shaft rotatably mounted in the base and positioning said contact, said shaft having a circumferential groove therein, a stop member in said groove, and a pin mounted in the base and extending into the groove, whereby the pin retains the shaft in the base and cooperates with the stop member to limit the rotation of the shaft.

13. In a potentiometer having a hollow housing, an axial shaft, a resistance element and a slip ring in the housing, and a movable contact assembly on the shaft slidingly contacting the resistance element and the slip ring, the improved construction wherein the slip ring has a cross-sectionally flat outer surface conforming to the inner surface of the housing and having a fastener terminal with the inner end thereof threadedly attached to the slip ring and extending radially out through a snugly-fitting aperture in the housing to hold the ring in position and provide an electrical terminal therefor, the fastener terminal being the sole fastening means for the slip ring.

14. In a potentiometer having a resistance element and a shaft, a wiper assembly comprising a pair of members having apertures and resilient means joining said members along a line such that the apertures are pressed together, and a contact engaging the resistance element and mounted on one of said members, the apertures forming a straight unimpeded passage of a size decreasing with increase of the angle between the members, the shaft extending through both apertures and the resilient means clamping the edges of both apertures on the shaft, the shaft being frictionally rotatable in the apertures, at least the member bearing the contact being conducting, and the portion of the shaft engaged by said member being insulating.

References Cited in the file of this patent
UNITED STATES PATENTS

| | | |
|---|---|---|
| 2,217,752 | Jandus | Oct. 15, 1940 |
| 2,346,598 | Mucher | Apr. 11, 1944 |
| 2,606,984 | Burgess | Aug. 12, 1952 |
| 2,706,760 | Mucher | Apr. 19, 1955 |
| 2,778,906 | Burgess | Jan. 22, 1957 |